United States Patent [19]
Cunningham et al.

[11] Patent Number: 5,093,695
[45] Date of Patent: Mar. 3, 1992

[54] CONTROLLABLE SEMICONDUCTOR MODULATOR HAVING INTERLEAVED CONTACTS

[75] Inventors: John E. Cunningham, Lincroft; Keith W. Goossen, Aberdeen; William Y. Jan, Scotch Plains, all of N.J.

[73] Assignee: AT&T Bell Laboratories, Murray Hill, N.J.

[21] Appl. No.: 526,084

[22] Filed: May 18, 1990

[51] Int. Cl.⁵ .............. H01L 29/161; H01L 29/48; H01L 29/56; H01L 29/64
[52] U.S. Cl. .............................. 357/15; 357/16; 357/30; 357/4
[58] Field of Search ..................... 357/30, 4, 15, 16

[56] References Cited

U.S. PATENT DOCUMENTS 4,525,687  6/1985  Chemla et al. ............... 332/7.51
4,716,449  12/1987  Miller ........................... 357/30
4,947,233  8/1990  Biefeld et al. .................. 357/30

OTHER PUBLICATIONS

G. H. Döhler, "Doping Superlattices", J. Vac. Sci. Tech. May/Jun. 1979, pp. 851–856.
Appl. Phys. Lett. 50 (14), Apr. 6, 1987, "Tunable Electroabsorption in Gallium Arsenide Doping Superlattices", C. J. Chang-Hasnain, et al., pp. 915–917.
Appl. Phys. Lett. 51 (23), Dec. 7, 1987, "Modulation of Light by an Electrically Tunable Multilayer Interference Filter", G. W. Yoffe, et al., pp. 1876–1878.
Appl. Phys. Lett. 52 (8), Feb. 22, 1988, "Large Optical Nonlinearities in a GaAs/AlGaAs Hetero n-i-p-i Structure", Kost et al., pp. 637–639.
Electronics Letters, Jul. 21, 1988, vol. 24, No. 15, "Photonic Switching by Tunneling-Assisted Absorption Modulation in a GaAs Sawtooth Structure", Schubert et al., pp. 980–982.
Appl. Phys. Lett., 53(8), Aug. 22, 1988, "Electrically Tunable Fabry-Perot Mirror Using Multiple Quantum Well Index Modulation", Simes et al., pp. 637–639.

Primary Examiner—Andrew J. James
Assistant Examiner—Donald L. Monin, Jr.
Attorney, Agent, or Firm—Gregory C. Ranieri

[57] ABSTRACT

In a semiconductor optical modulator, two semiconductor materials having different refractive indices are grown in an alternating sequence of layers to form a semiconductor mirror wherein each layer has approximately a quarter wave thickness for a predetermined wavelength. Delta doping is performed at each heterointerface. The delta doping conductivity type alternates from one heterointerface to the next. Lateral surface contacts are selectively made to the n-type heterointerfaces on one edge of the mirror and to the p-type heterointerfaces on the other edge of the mirror. An interleaved ohmic contact structure results within the modulator. By applying a nominally low voltage to the lateral surface contacts, it is possible to effect refractive index changes in the layers so that the mirror performs reflection or transmission of an impinging light beam.

8 Claims, 2 Drawing Sheets

CONTROLLABLE SEMICONDUCTOR MODULATOR HAVING INTERLEAVED CONTACTS

TECHNICAL FIELD

This invention relates to optical modulators and, more particularly, to semiconductor devices for modulating optical beams by employing refractive index variations.

BACKGROUND OF THE INVENTION

Optical computing, optical switching, and optical interconnection are three emerging areas in which it is necessary to modulate optical beams. In the optical computing and optical interconnection fields, a high degree of interest has been generated by semiconductor devices and arrays which operate on light beams propagating normal to the surface plane of the device or array. Such devices are commonly described as "surface-normal" devices. Interest in surface-normal devices and arrays is high both because the devices are relatively compact which permits array fabrication and because optical coupling to and from the devices is effected in a simple and convenient fashion.

With respect to optical modulators, a wide variety of surface-normal optical modulators have appeared recently. Among the first surface-normal optical modulators were those based on electroabsorption in semiconductor quantum wells. That is, optical beams impinging on the surface of the modulator were either absorbed by the semiconductor quantum well or permitted to pass through the modulator without significant absorption in response to electrically induced changes in the optical absorption coefficient of the semiconductor material. As a result, the optical signal output from the modulator was a optical version of the electrical signal impinging on the modulator. An example of a high speed, surface-normal optical modulator based on the principles of electroabsorption and employing semiconductor quantum well material is shown in U.S. Pat. No. 4,525,687.

Temperature sensitivities of modulators employing electroabsorption detract to some degree from their appeal to device and system designers. When these modulators absorb the optical beam, the absorption process causes the modulator to undergo increasing thermodynamic effects. This is particularly deleterious for semiconductor quantum well electroabsorption modulators because the optical beams are tuned to a wavelength near the absorption band edge of the quantum well material. The absorption edge is extremely sensitive to temperature changes. Heating in the modulator through the absorption process induces a shift in the absorption edge in the semiconductor quantum well material so that the wavelength of the optical beam is no longer aligned with the absorption edge of the modulator. As a result, the modulator is rendered incapable of modulating the optical beam. Another related problem for electroabsorption modulators arises from electrical carrier production during modulation caused by absorption. Electrical carriers tend to screen an applied electrical field and, thereby, cause modulation to cease when carrier populations approach a sufficiently high level. Carrier production also tends to decrease the optical absorption coefficient of the semiconductor material. This limits the applicability of the semiconductor electroabsorption modulators to operation on beams which exhibit low optical intensity.

In contrast to electroabsorption modulators, optical modulators have been designed to utilize refractive index changes of the semiconductor material for controlling transmission of optical beams through the modulator. Since these devices do not entail optical absorption processes, the problems described above for electroabsorption modulators are avoided. Optical modulators employing refractive index changes do not absorb the impinging optical beams. As a result, thermal and electrical effects are avoided in the modulation process and high intensity modulation is thereby permitted. In addition, modulators employing refractive index changes appear more useful for the construction of systems because the modulator is switched between transmission and reflection states. There is effectively no loss of the optical beam in the modulator. As a result, modulators employing refractive index changes can be read by two detectors, namely, one detector measuring reflected optical signals and the other detector measuring transmitted optical signals, which in turn leads to increased system flexibility.

Prior attempts at realizing surface-normal modulators employing refractive index changes have achieved only moderate success because the modulation depth is, to a first approximation, proportional to the product of the refractive index change of the semiconductor material and the thickness of the semiconductor material. Refractive index changes depend upon the choice of the semiconductor material and the size of the electrical field which may be impressed on the semiconductor material. From the available technical articles, it is determined that thicknesses for semiconductor material generally used in such refractive index modulators are typically five to ten times larger than semiconductor material thicknesses in absorptive modulators which provide similar modulation performance. Typical semiconductor refractive index modulators are described in *Applied Physics Letters*, Vol. 51, No. 23, pp. 1876–8, (1987) and *Applied Physics Letters*, Vol. 53, No. 8, pp. 637–9, (1988). As a practical matter for surface-normal modulators, it is desirable to orient the controlling electric field in a direction perpendicular to the semiconductor layers of the modulator. Applied voltages for reported surface-normal refractive index modulators are significantly higher than those for reported surface-normal electroabsorption modulators when performing comparable levels of modulation.

The refractive index modulator described in the 1987 article cited above consists of a dielectric mirror consisting of thirty periods of GaAs and AlAs semiconductor layers whose individual layer thicknesses are equal to a predetermined wavelength divided by the product of four and the respective refractive index. Such a mirror is highly reflecting for a range of wavelengths around the predetermined wavelength. At the edge of the range, the modulator abruptly becomes transmitting. An electrical field is applied perpendicular to the layers of the mirror via contacts at the top and bottom of the mirror. Application of an electric field to the mirror induces changes in the refractive index of the GaAs layers which, in turn, causes the reflection characteristic of the mirror to shift position slightly. Optical beams tuned near the edge of the reflection range for the mirror experience the shift of the reflection characteristic are modulated thereby. In order to obtain a modest degree of modulation, it was necessary to operate the device with an applied voltage on the order of 50 to 100 volts. Such levels of applied voltage are prohibitively high and, therefore, undesirable for optical computing and optical interconnection applications.

SUMMARY OF THE INVENTION

Low voltage operation is achieved in an optical modulator operating via refractive index changes in accordance with the principles of the invention wherein the optical modulator is realized as a periodic semiconductor heterostructure having alternating conductivity type dopant layers at successive heterointerfaces. A lateral doped contact layer is deposited on each side of the modulator heterostructure. Each doped contact layer selectively contacts all dopant layers of the same conductivity type to form an interleaved contact structure within the modulator heterostructure. As a result, the voltage applied via the contact layers appears equally across each layer of the periodic semiconductor heterostructure thereby significantly reducing the voltage required to produce a desired electric field strength.

In one embodiment, the modulator is realized using a periodic structure of GaAs and AlAs semiconductor layers. Dopant layers are formed by using standard delta doping techniques at the heterointerfaces so that the conductivity type alternates from p-type to n-type and so on.

In another embodiment, the modulator is realized in a periodic structure where quantum wells are employed in the narrow bandgap material to achieve larger refractive index changes for the same applied electric field.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

In accordance with the principles of the present invention, a surface-normal semiconductor optical modulator has been realized. This modulator operates at attractively low voltages which cause modulation of impinging optical beams to occur via induced changes of the refractive index of the semiconductor material in the modulator. Since the present modulator does not absorb the optical beams impinging thereon, deleterious thermal and electrical effects are avoided.

In the present semiconductor optical modulator, two semiconductor materials having different refractive indices are grown in an alternating sequence of layers to form a semiconductor mirror having a periodic structure wherein each layer has approximately a quarter wave thickness for a predetermined wavelength. A delta doped layer is inserted at each heterointerface. The conductivity type of each delta doped layer alternates from one heterointerface to the next. Lateral surface ohmic contacts are selectively made to the n-type delta doped layers along one edge of the semiconductor heterostructure and to the p-type delta doped layers along the other edge of the semiconductor heterostructure. An interleaved ohmic contact structure results within the modulator. By applying a nominally low voltage to the lateral surface contacts, it is possible to effect refractive index changes in the layers so that the mirror performs modulation via reflection and transmission of an impinging light beam.

Delta doping is understood to be synonymous with the term "atomic planar doping". While the use of delta doped layers is described in the exemplary embodiments, it is contemplated that thin highly doped layers of semiconductor material may be substituted for the delta doped layers. It is contemplated that the thin highly doped layers would exhibit a thickness greater than the thickness of a monolayer of dopant atoms.

The modulator may be fabricated by standard epitaxial processing techniques such as molecular beam epitaxy and vapor phase epitaxy such as metal organic chemical vapor deposition. Fabrication techniques including semiconductor layer growth, impurity doping, atomic planar layer or delta impurity doping, photolithography and contact metallization to realize a device in accordance with the principles of the invention described above are believed to be well known to those persons of ordinary skill in the art.

Figure 1:
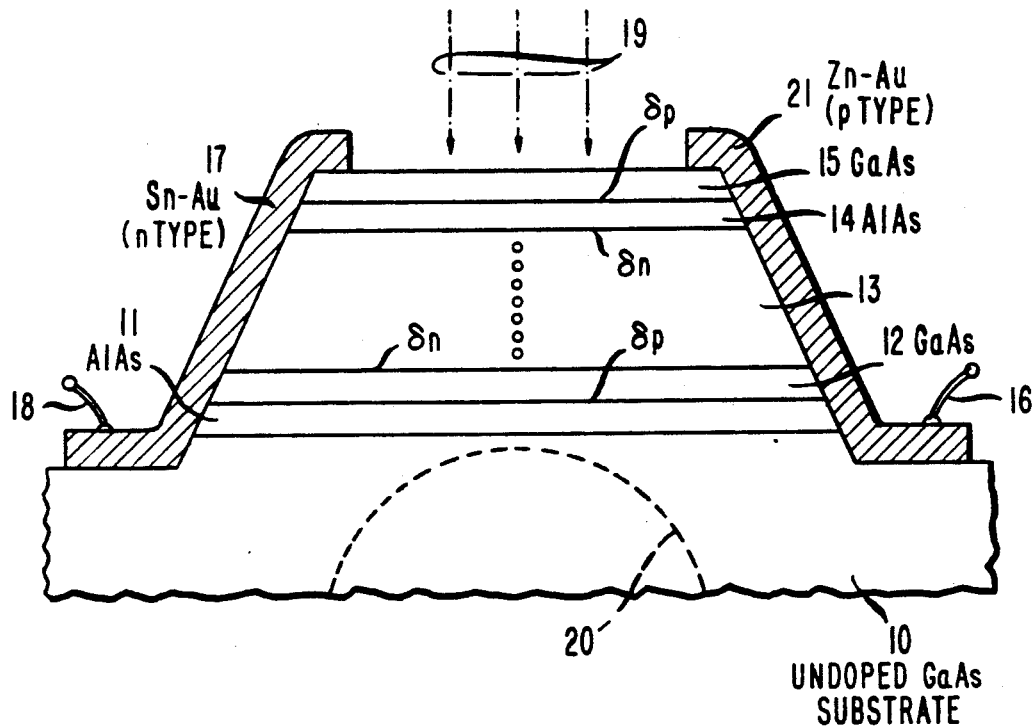
FIG. 1 shows a view of an exemplary embodiment of a semiconductor modulator realized in accordance with the principles of the invention.

An exemplary semiconductor modulator structure realized in accordance with the principles of the invention is shown in FIG. 1. The modulator modulates optical beam 19 which impinges on the modulator structure at a wavelength $\lambda_s$. For the particular device structure and composition described below, $\lambda_s$ is chosen to be 1.06 $\mu$m. The exemplary embodiment is epitaxially grown on undoped GaAs substrate 10. A periodic stack of semiconductor layers forms a dielectric mirror wherein the periodic stack comprises a sequence of pairs of layers as follows: wide bandgap layer 11, dopant layer $\delta p$, narrow bandgap layer 12, and dopant layer $\delta n$. For the exemplary embodiment, layer 11 comprises AlAs, layer 12 comprises GaAs, layer $\delta p$ comprises p dopant material such as Be, Mg, C, Zn, and Ge, and layer $\delta n$ comprises n dopant material such as Si, Sn, Se, and S. Region 13 comprises a number of periods of the sequence of pairs of layers described above. Layers 14 and 15 comprise the final pair of layers in the periodic stack. Layer 14 is a wide bandgap layer shown with a $\delta n$ layer beneath and a $\delta p$ layer above. Layer 15 is a narrow bandgap layer. Antireflection coating may be applied to control reflection effects and also to passivate layer 15. The use of antireflection coating material is optional and not shown in the figures. Reflections may be controlled by judicious selection of the thickness for layer 15. In an example from experimental practice the thickness of layer 15 was chosen to be 900 Å, which is slightly larger than the thickness for the narrow bandgap layers in the periodic stack. For the structure shown in FIG. 1, wide bandgap layers had a thickness of approximately 835 Å, whereas narrow bandgap layers had a thickness of approximately 715 Å. Thirty periods of the pairs of layers were grown on substrate 10. Each doping layer was deposited to yield a carrier concentration of approximately $10^{13}$ cm$^{-2}$.

After growth of the heterostructure, etching was performed to realize a mesa structure. Dimensions of exemplary mesas were approximately 200 $\mu$m square. Standard photolithography and etching techniques are suitable for realizing the mesas. In experimental practice, a solution of 64:20:16 $H_2O:H_2O_2:H_3PO_4$ was used to produce the mesa which exhibited outwardly sloping lateral edges as shown in FIG. 1.

Conventional selective doping contacts were deposited on the lateral edges of the mesa in order to provide ohmic contact to the doping layers. Particularly, contact 21 provides ohmic contact to layers δp while contact 17 provides ohmic contact to layers δn. Leads 16 and 18 provide application of an electrical voltage to the modulator at contacts 21 and 17, respectively. In an example from experimental practice, the p-type contact is fabricated using a metal such as gold doped with an exemplary p-type dopant such as zinc. The n-type contact is fabricated in a similar manner using a metal such as gold doped with an exemplary n-type dopant such as tin. Standard metallic deposition techniques are employed in fabricating contacts 17 and 21. Alloying is performed for an appropriate period of time (e.g., for one minute at 440° C.) and at an appropriate temperature to cause selective contacting of the doped layers. In the region adjacent to contact 21, layers δp form ohmic contacts with contact 21 whereas layers δn form a rectifying contact with contact 21. In the region adjacent to contact 17, layers δn form ohmic contacts with contact 17 whereas layers δp form a rectifying contact with contact 17.

Figure 2:
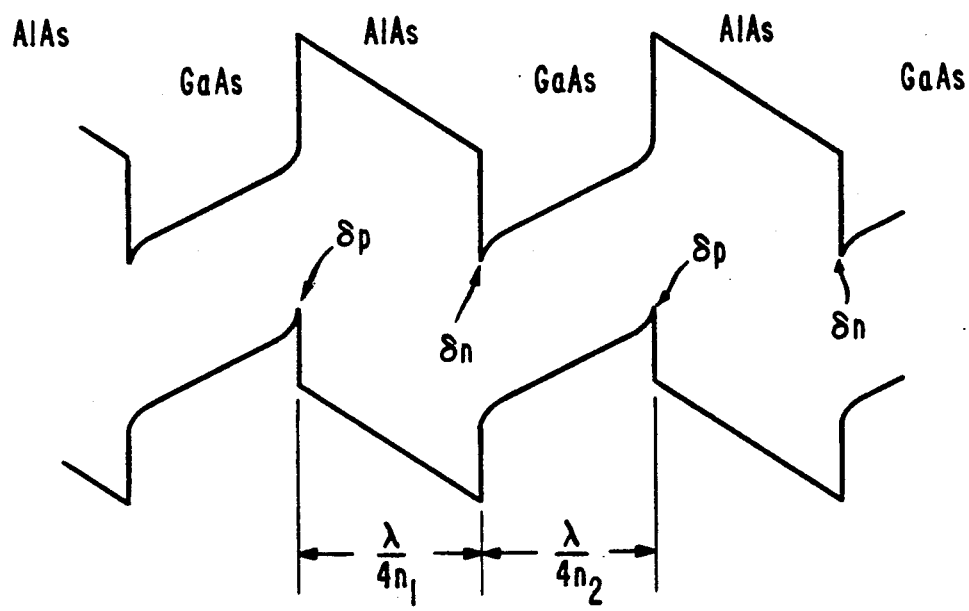
FIGS. 2 and 4 show energy band diagrams of exemplary embodiments of this invention under a substantially zero bias condition.
Figure 3:
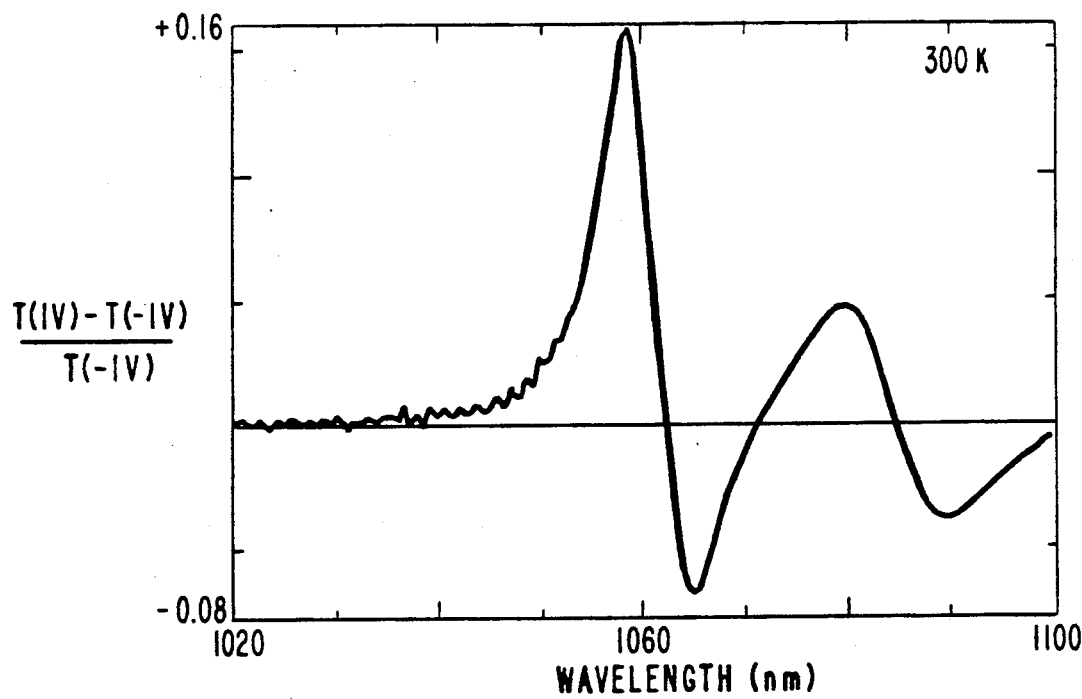
FIG. 3 shows a plot of the differential transmission versus wavelength caused by shifting of the reflection characteristic for the modulator in response to two different voltages.

FIG. 2 shows an energy band diagram for a portion of the periodic stack in FIG. 1. As shown in FIG. 2, the thickness of each layer is determined as a function of a predetermined wavelength divided by four times the refractive index of the semiconductor material comprising that layer. It is desirable to choose the predetermined wavelength λ to be less than the wavelength of optical beam 19. It is contemplated, however, that optical beam 19 exhibits a wavelength which is less than the predetermined wavelength used in designing the layer thicknesses in the periodic stack.

Differential transmission versus wavelength is shown for operation of the modulator from FIG. 1. The differential transmission characteristic was caused by shifting of the reflection characteristic for the modulator in response to applied voltages of 1V and −1V. For this device, the maximum relative transmission change of approximately 16% occur at a wavelength of 1.0585 μm. The maximum change in transmission defined in the numerator of the differential transmission equation was 4.6% at a wavelength of 1.06 μm.

Figure 4:
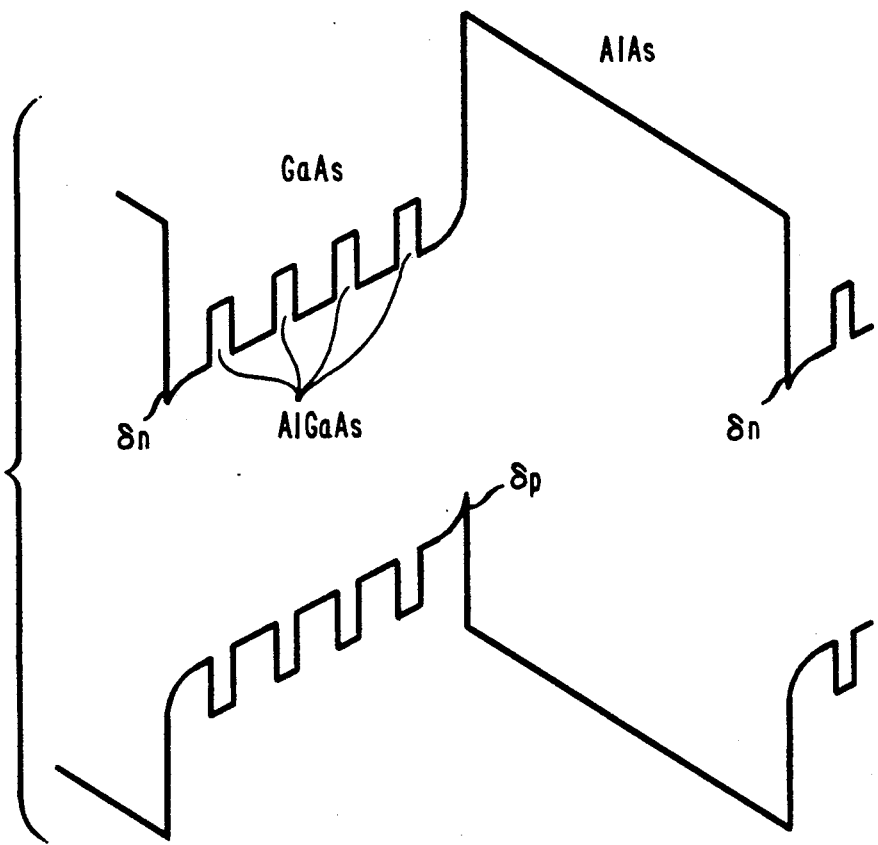

It is contemplated that quantum wells may be included in the narrow bandgap layer of each pair in the periodic stack in order to increase the amount of change in the refractive index for a given applied electric field. As shown in FIG. 4, a multiple quantum well structure is shown wherein the quantum wells are formed by GaAs layers separated by wider bandgap barrier layers of AlGaAs. For an exemplary structure as shown in FIG. 4, the narrow bandgap quantum wells have a thickness of approximately 92 Å while the wider bandgap barriers have a thickness of approximately 35 Å.

It should be noted that a fundamental advantage of a modulator realized in accordance with the principles of the present invention is that a voltage applied to the contacts appears identically across each period. Hence, a desired electric field strength necessary to cause refractive index changes sufficient for modulation of the optical beam is achieved with significantly less voltage than prior art structures.

It is understood that, while the material system GaAs/AlAs is described above for fabricating the modulator semiconductor heterostructure, other material may be selected from other semiconductor Group III-V systems such as GaAs/AlGaAs, InGaAs/InAlAs, InGaAs/InGaAlAs, GaAsSb/GaAlAsSb and InGaAsP/InP. In these semiconductor systems, the layers may be lattice-matched to suitable GaAs or InP substrates. Mismatching is also contemplated wherein strained layers are grown over the substrate material. Finally, extension of the device structures is also contemplated to semiconductor compounds in Group II-VI and Group IV.

As shown in FIG. 1, it may be desirable to etch a shallow recess 20 into the substrate to permit more effective light transmission through the modulator.

We claim:

1. A semiconductor device comprising: a plurality of pairs of semiconductor layers, each pair of semiconductor layers comprising a first semiconductor layer having a first refractive index and being substantially undoped, a first delta doping layer, a second semiconductor layer having a second refractive index and being substantially undoped, and a second delta doping layer, said first refractive index being different from said second refractive index and said first delta doping layer having an opposite conductivity type to said second delta doping layer, said first and second semiconductor layers having different energy bandgaps, said device being formed as a mesa and having first and second contact layers disposed on lateral surfaces of said mesa, said first contact layer including dopant material of similar conductivity type to that of said first delta doping layer for forming a first ohmic contact between said first contact layer and said first delta doping layer in each pair, said second contact layer including dopant material of similar conductivity type to that of said second delta doping layer for forming a second ohmic contact between said second contact layer and said second delta doping layer in each pair such that an electrical field may be applied perpendicular to said first and second semiconductor layers.

2. The semiconductor device as defined in claim 1 wherein said first semiconductor layer has a first thickness and first refractive index such that the product of said first thickness and first refractive index equals the product of one-fourth and a predetermined wavelength, and said second semiconductor layer has a second thickness and second refractive index such that the product of said second thickness and second refractive index equals the product of one-fourth and said predetermined wavelength.

3. The semiconductor device as defined in claim 1 further comprising means for directing a beam of light substantially perpendicular to a layer plane of said first semiconductor layer.

4. The semiconductor device as defined in claim 3 wherein said beam of light has a wavelength substantially near said predetermined wavelength.

5. The semiconductor device as defined in claim 1 wherein said first and second semiconductor layers comprise semiconductor material selected from Group III-V semiconductor systems.

6. The semiconductor device as defined in claim 5 herein said first and second semiconductor layers comprise compounds selected from the GaAlAs system.

7. The semiconductor device as defined in claim 5 wherein said first and second semiconductor layers comprise compounds selected from the InGaAlAs system.

8. The semiconductor device as defined in claim 5 wherein said first and second semiconductor layers comprise compounds selected from a InGaAsP system.

* * * * *